3,554,860
ORGANIC FIBER-ANTHOPHYLLITE FIBER SHEET AS A FRICTION MATERIAL
Arthur J. Lacroix, Jr., Milford, Conn., assignor to Raybestos-Manhattan, Inc., Passaic, N.J., a corporation of New Jersey
No Drawing. Filed Mar. 30, 1967, Ser. No. 626,925
Int. Cl. D21h
U.S. Cl. 162—145                                                  6 Claims

ABSTRACT OF THE DISCLOSURE

Paper base friction material and wet felting method for producing same comprised of a porous, flexible sheet of a mixture of 40% to 60% organic and 40% to 60% of anthophyllite asbestos fibers, the paper base further including resin binder incorporated during felting or subsequent thereto. The paper is ultimately bonded to a metal mounting member whereby it is useful as friction material particularly in oil such as in automotive automatic transmissions.

---

This invention relates to a felted fibrous friction material composition characterized by its particular asbestos content and found to give improved felting properties and performance and durability in torque transmitting and braking devices which require the friction material in a liquid medium, most usually lubricating and cooling oils.

More specifically, the invention relates to a new and unusual paper product that, when processed by techniques now well known in the art, provides useful and heretofore unobtainable characteristics in wet friction applications such as are found in automotive automatic transmission clutches and bands as well as brake and torque transmitting devices of "off the road" and industrial equipment.

The term "paper product" or "paper base product" or "paper base friction material" is more specifically defined for purposes of this invention as a material that has been processed, i.e. wet felted, through standard paper making techniques for use as a friction material. Generally, an organic fiber, either natural or man-made, is refined and then mixed with a percentage of asbestos fiber and one or more specifically selected fillers and friction augmenting agents in a hydropulper or beater operation. At times it may be desirable to add a pulverulent or dispersed liquid thermosetting resinous binder at this stage of the process although more frequently this is incorporated in a separate liquid saturating operation on the dried paper. In any case, the prepared slurry is then felted on any standard paper making equipment such as one having a Fourdrinier wire or rotoformer cylinder whereby the water is removed and a single ply sheet is formed and dried. The dried sheet can then be resin saturated if the binder has not already been added in the wet end. The resin containing paper, in the form of discs, is then adhesively bonded as by means of a thermosetting resin, to a steel backing plate or core of the desired dimensions with the resin impregnant and adhesive cured by application of heat and pressure in the single bonding operation. Alternatively, since cure conditions of time and temperature are a function of binder used, it is sometimes desirable to cure the resin containing paper in a separate operation. In any case, the object is the same: To attach the paper base material to one or both faces of a suitable support core, such as steel driving disc of an automatic transmission so that the final product is a cured, low density friction composition of suitable dimensions and proper strength for use in the desired braking or clutching operation against a metal mating member.

The use of paper base products as friction material in the aforementioned wet friction applications have shown many advantages over the more conventional metallic, semi-metallic, high density materials as well as low density cork products, and, as such, they have found a steadily increasing acceptance. Their chief advantages result from the fact that friction level and corresponding torque characteristics are functions of porosity and flexibility of the processed friction material and these properties can be most readily controlled at low cost in the paper process. Porosity is important for several reasons, for example, the oil film between friction material and mating member can be squeezed into the available pores permitting improved contact between the rubbing surfaces. The pores then tend to act as a wiping groove pattern, reducing or eliminating oil film thickness and permitting a higher measured coefficient of friction. In many cases the action is sufficient to eliminate the need for any mechanically added grooves. Again, the pores in the paper structure are interconnected and thereby permit a flow of oil through the friction material. This flow can result from mechanically forcing oil through the clutch or brake by external pumping action or through centrifugal or thermal forces within the unit itself. In any case, the circulation provides cooling action that, by limiting heat buildup at the mating surfaces, lends to the increased durability and improved fade resistance, i.e. reduced coefficient of friction as temperature of the friction material increases.

By proper selection of type and amount of fibers and binders in the paper composition some flexibility and resiliency can be incorporated to contribute to the high friction properties that have become associated with this type of material and which have not been obtainable with competitively priced products. It is well known that in application of a friction material against a metallic mating member, contact area at any instant can be considerably less than that calculated from dimensions. Imperfections, even microscopic imperfections and movement, particularly of the metallic spacer component under mechanical and thermal stresses resulting from the application, effectively reduce this area. It can be readily seen that if a friction material were flexible and resilient enough to compensate for these imperfections and movements a much more effective use of available surface area could be obtained.

By incorporating well fibrilated, resilient organic fibers such as natural cellulose fibers, for example, cotton linters, or some man-made organic fibers such as nylon, rayon, etc., and by incorporating flexible thermosetting resinous binders such as phenol-formaldehyde or phenolic modified resins these desired properties can easily be obtained in a paper type friction material. Because of the necessity of using some organic fibers, particularly in wet felting, and organic binder to produce the desired effect of porosity and because of the fact that porosity itself results in low heat capacity and thermal conductivity of the material, paper products are sometimes limited in applications where there is a relatively high energy absorption rate and/or where there is a relatively low flow of cooling oil to remove the heat produced in the friction application. It is also desirable and conventional to use asbestos fibers in admixture with the organic fibers in friction composition elements, for their frictional and heat resistant properties and strength.

Heretofore use has been made of the chrysotile variety of asbestos, and while these fibers are strong, they are not most amenable to wet felting, being considered a slow filtering stock resulting in a tendency to use the least amount possible.

The object of this invention is to extend the use of asbestos fibers in paper products, taking advantage of their desirable properties while retaining the above described porosity and flexibility properties of such paper products in cooling oil flow applications.

It has been found that this object can be accomplished by employment of anthophyllite asbestos fibers, an amphibole variety in the paper composition in quantities limited only by (1) the amount that can be readily filtered and felted in the paper making operation and (2) the amount of organic fibers that can be replaced and not substantially interfere with porosity and flexibility of the finished product.

Due to its good filtering properties the use of anthophyllite asbestos fibers permits one to employ at least about 40% thereof by weight of the fiber-filler paper composition, absent binder, and up to about 60% with resultant reduction in organic fiber content and greater heat resistance.

The following example will serve to illustrate the invention:

50 parts by weight of cotton linters were processed as a slurry in a paper beater operation to the desired degree of freeness and then 45 parts by weight of an anthophyllite asbestos fiber and 5 parts by weight of red iron oxide were added and thoroughly mixed with the linters. This prepared slurry was diluted with water to a 2% solids mix and run on a standard Fourdrinier paper machine where a paper sheet of the above composition was readily formed and dried. The dried sheet was further saturated with a one-step thermo-setting phenol-formaldehyde resin in solution in ethyl alcohol so that following cure the resin picked was 45% based on the initial weight of the paper. The friction material thus produced was cut and machined to a disc of desired dimensions and bonded to the opposed faces of an adhesive coated steel clutch plate under heat and pressure to obtain a final friction material density of 40% of theoretical.

As previously indicated, the resin may be incorporated in the beater mix with the fibers and any filler that may be employed, so as to provide substantially the same proportion as above indicated, and this can be accomplished by employing a powdered two-stage resin mixture composed of novolak resin and hexamethylenetetramine.

Various friction modifying and augmenting agents such as red iron oxide or other materials can also be incorporated in minor proportion, say up to about 10% by weight, in partial replacement of the fibers. The relative proportions of organic and inorganic fibers conform to friction composition practice, and the same holds true for the finder proportions, although as previously indicated the present invention permits use of from about 40% to about 60% by weight of asbestos fibers, 0–10% fillers and the balance organic fibers, prior to resin impregnation.

I claim:

1. Friction material in porous, flexible, fibrous sheet form for use in friction devices in which the friction surfaces are lubricated with oil, characterized by having been formed from an aqeous slurry in continuous sheet form on paper making machinery comprised of a mixture of cellulosic and asbestos fibers wherein said asbestos fibers are wholly of the anthophyllite classification and comprise from about 40% to about 60% by weight of the sheet and wherein the cellulosic fiber content is from about 40% to about 60% by weight of the sheet, together with heat setting organic resin.

2. The friction material of claim 1 wherein the sheet contains up to about 10% by weight of filler particle material.

3. The friction material of claim 1 in bonded engagement with a metal mounting member therefor.

4. The method of forming porous, flexible friction material suitable for use in oil, which comprises preparing an aqueous slurry of from about 40% to about 60% by weight of anthophyllite asbestos fibers together with from about 0% to about 10% of filler particles and the balance cellulose fibers, forming, and drying the sheet. form on a paper making machine, and drying the sheet.

5. The method of claim 4 wherein thermosetting binder in powdered or dispersed liquid form is incorporated in the slurry.

6. The method of claim 4 wherein thermosetting binder in liquid form is incorporated in the sheet after formation and drying.

References Cited

UNITED STATES PATENTS

| 2,640,795 | 6/1953 | Bertolet, Jr., | 192—107 |
| 3,270,846 | 9/1966 | Arledter et al. | 162—145X |

OTHER REFERENCES

"The Condensed Chemical Dictionary," Reinhold Publishing Corporation, 3rd edition (1942), p. 98.

"Encyclopedia of Chemical Technology," Interscience Publishers, 2nd edition, vol. 2 (1963), p. 739.

S. LEON BASHORE Primary Examiner

R. H. TUSHIN, Assistant Examiner

U.S. Cl. X.R.

161—170; 192—107